US011039357B2

(12) United States Patent
Park et al.

(10) Patent No.: US 11,039,357 B2
(45) Date of Patent: Jun. 15, 2021

(54) HANDOVER METHOD IN MOBILE COMMUNICATION SYSTEM

(71) Applicant: ELECTRONICS AND TELECOMMUNICATIONS RESEARCH INSTITUTE, Daejeon (KR)

(72) Inventors: Hyun Seo Park, Daejeon (KR); Hyun Lee, Daejeon (KR); Tae Joong Kim, Daejeon (KR); Hee Soo Lee, Daejeon (KR); Yu Ro Lee, Daejeon (KR); Eun Kyung Kim, Daejeon (KR); An Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 81 days.

(21) Appl. No.: 15/984,159

(22) Filed: May 18, 2018

(65) Prior Publication Data
US 2018/0338271 A1    Nov. 22, 2018

(30) Foreign Application Priority Data

May 19, 2017    (KR) .................. 10-2017-0062563
Jun. 21, 2017   (KR) .................. 10-2017-0078800
May 2, 2018     (KR) .................. 10-2018-0050914

(51) Int. Cl.
*H04W 36/08*    (2009.01)
*H04W 36/00*    (2009.01)
(Continued)

(52) U.S. Cl.
CPC .......... *H04W 36/08* (2013.01); *H04B 7/0695* (2013.01); *H04W 36/0077* (2013.01);
(Continued)

(58) Field of Classification Search
None
See application file for complete search history.

(56) References Cited

U.S. PATENT DOCUMENTS 9,408,122 B2    8/2016  Tsai et al.
2008/0267131 A1*  10/2008  Kangude ........... H04W 36/0072
                                                         370/331
(Continued)

OTHER PUBLICATIONS

3GPP TSG RAN2, Meeting #97bis, R2-1702673, Apr. 3, 2017 "Handover command and CSI-RS configuration of target". Ericsson.
(Continued)

*Primary Examiner* — Ayaz R Sheikh
*Assistant Examiner* — Sori A Aga
(74) *Attorney, Agent, or Firm* — Rabin & Berdo, P.C.

(57) ABSTRACT

An operation method of a terminal, for a handover in a mobile communication system, may comprise performing measurement on beams of a target base station, and transmitting a measurement result of at least one beam of the target base station to a source base station; receiving, from the source base station, a handover command message including information on at least one RACH resource for the at least one beam; transmitting a handover indication message including information on at least one random access target beam having an order of channel conditions determined based on a latest measurement to the source base station and to the target base station through the source base station; and determining an optimal beam among the at least one random access target beam, and transmitting a RACH to the target base station through a RACH resource allocated to the optimal beam.

18 Claims, 11 Drawing Sheets

(51) Int. Cl.
*H04W 74/08* (2009.01)
*H04B 7/06* (2006.01)
*H04W 88/08* (2009.01)

(52) U.S. Cl.
CPC ... *H04W 36/0083* (2013.01); *H04W 74/0833* (2013.01); *H04W 36/0058* (2018.08); *H04W 88/08* (2013.01)

(56) References Cited

U.S. PATENT DOCUMENTS

| | | |
|---|---|---|
| 2015/0358864 A1 | 12/2015 | Park et al. |
| 2016/0309380 A1 | 10/2016 | Zhang et al. |
| 2017/0086106 A1 | 3/2017 | Yiu et al. |
| 2017/0094577 A1 | 3/2017 | Kim et al. |
| 2017/0127334 A1 | 5/2017 | Park |
| 2017/0164254 A1 | 6/2017 | Takano et al. |
| 2018/0176958 A1* | 6/2018 | Islam ................ H04W 74/0833 |
| 2019/0387440 A1* | 12/2019 | Yiu .................... H04W 36/0072 |

OTHER PUBLICATIONS

3GPP TSG RAN2, Meeting #98, R2-1704840, May 6, 2017 "Baseline handover procedure for inter gNB handover in NR". Huawei, HiSilicon.

\* cited by examiner

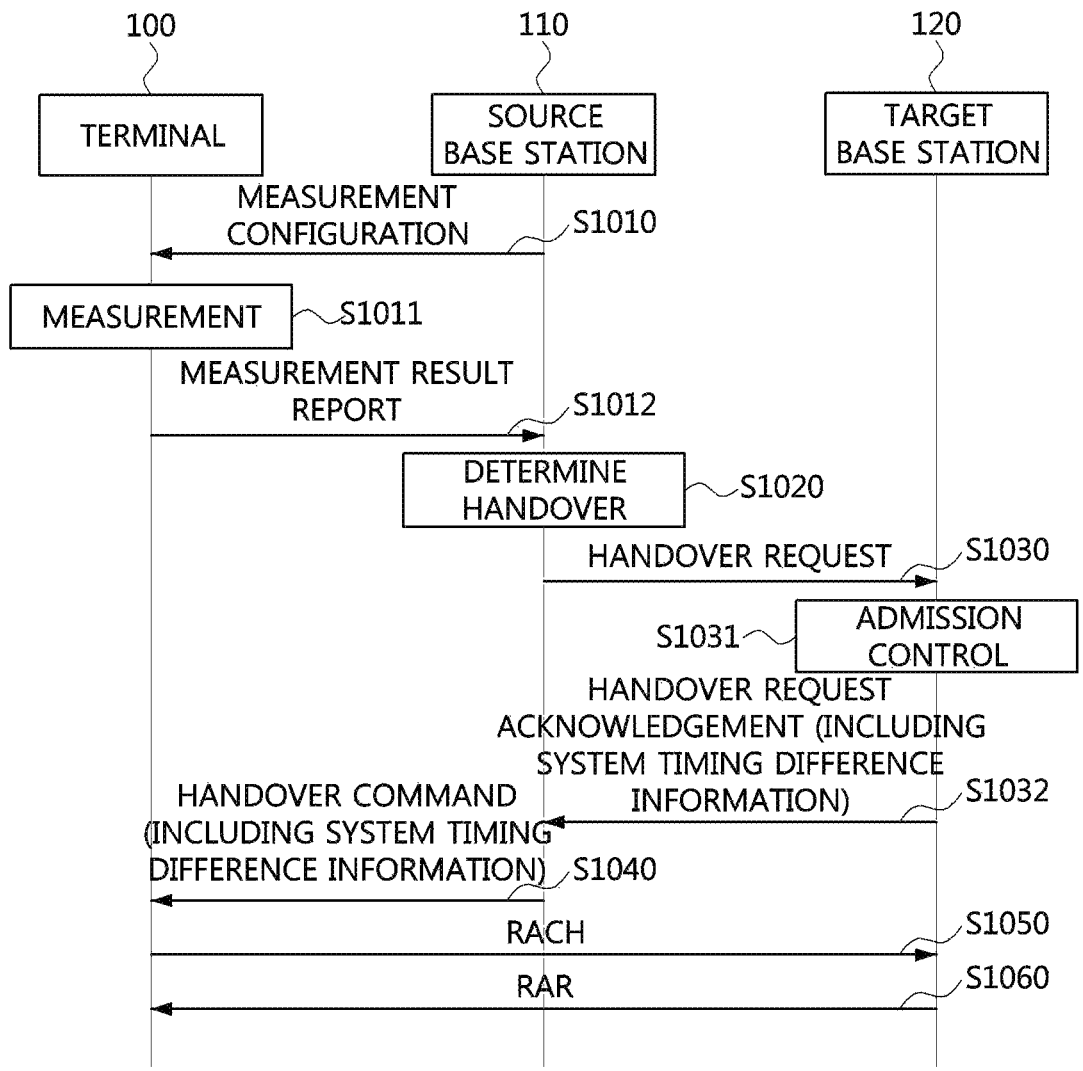
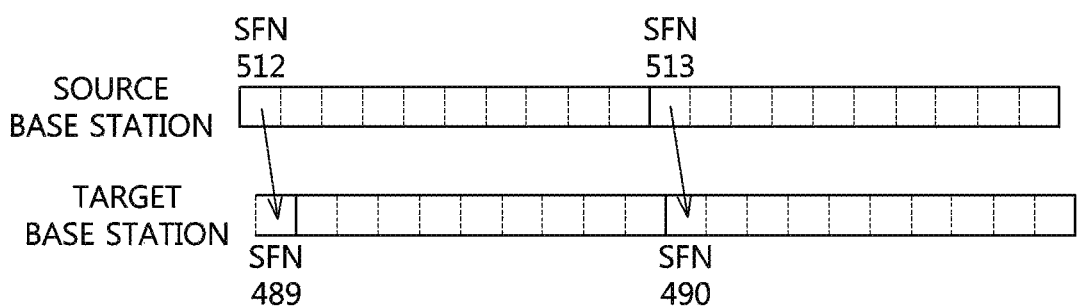

```
RACH-Skip-r14 ::=            SEQUENCE {
   targetTA-r14              CHOICE {
      ta0-r14                   NULL,
      ptag-r14                  NULL,
      pstag-r14                 NULL,
      mcg-STAG-r14              STAG-Id-r11,
      scg-STAG-r14              STAG-Id-r11
   },
   ul-ConfigInfo-r14         SEQUENCE {
      numberOfConfUL-Processes-r14    INTEGER (1..8),
      ul-SchedInterval-r14      ENUMERATED {sf2, sf5, sf10},
      ul-StartSubframe-r14      INTEGER (0..9),
      ul-Grant-r14              BIT STRING (SIZE (16))
   }                                   OPTIONAL   -- Need OR
}
```

HANDOVER METHOD IN MOBILE COMMUNICATION SYSTEM

CROSS-REFERENCE TO RELATED APPLICATIONS

This application claims priorities to Korean Patent Applications No. 10-2017-0062563 filed on May 19, 2017, No. 10-2017-0078800 filed on Jun. 21, 2017, and No. 10-2018-0050914 filed on May 2, 2018 in the Korean Intellectual Property Office (KIPO), the entire contents of which are hereby incorporated by reference.

BACKGROUND

1. Technical Field

The present disclosure relates to handover technologies in a mobile communication system, and more specifically, to handover methods for reducing a handover interruption time in a mobile communication system.

2. Related Art

The $3^{rd}$ Generation Partnership Project (3GPP) is in the process of standardizing New Radio (NR), which is a new radio access technology (RAT) for 5G mobile communications. In the NR, a handover procedure is performed as a network-controlled handover procedure based on the long-term evolution (LTE) handover procedure. That is, a source base station may determine a target base station, instruct the target base station to prepare for a handover, and transmit a handover command message to a terminal. The terminal receiving the handover command message may then execute the handover to the target base station. In the NR mobile communication system, since a base station may form multiple beams differently from the LTE mobile communication system, the handover command message may include information related to beams of the target base station for a fast access when the terminal handovers to the target base station. The beam-related information of the target base station may include at least one beam through which the terminal attempts to access and Random Access Channel (RACH) configuration information to be used for the at least one beam.

However, in the NR mobile communication system utilizing a high frequency, since a channel state changes rapidly according to movement of the terminal, an optimal beam of the target base station determined during the handover preparation operation may not be an optimal beam at the time of handover execution. Accordingly, if the terminal accesses to the non-optimal beam at the target base station, or if the channel state of the beam of the target base station is very poor, the handover through the corresponding beam may fail.

The 3GPP has completed standardization of two enhanced handover methods to reduce a handover interruption time. In a Make-Before-Break (MBB) handover which is the first method, a connection with a source base station is maintained during a handover, and a connection with a source base station is disconnected after a connection to a target base station is completed, thereby reducing the handover interruption time. In a RACH-less handover which is the second method, a random access procedure (i.e., a RACH transmission procedure) for the target base station is omitted, and an uplink message can be directly transmitted, thereby reducing the handover interruption time. The MBB handover and the RACH-less handover may be configured independently of each other, and when the two handover methods are combined, the handover interruption time can be substantially eliminated.

In the standardized RACH-less handover, a terminal should receive uplink allocation information without the RACH transmission procedure so that it can transmit an uplink message. In one method, the target base station may transmit the uplink allocation information to the source base station, and the uplink allocation information may be transmitted to the terminal as included in the handover command message. Alternatively, the target base station may dynamically transmit the uplink allocation information to the terminal at the time of handover, and the terminal may receive the uplink allocation information and use it for transmission of the uplink message. However, since the target base station does not know exactly when the terminal executes the handover, the target base station cannot determine from which time point uplink resources should be reserved and until which time point the uplink resources should remain as reserved, and thus there is a problem that the uplink resources are wasted.

SUMMARY

Accordingly, as an enhanced handover method in a mobile communication system, embodiments of the present disclosure provide a handover method for reducing a handover interruption time, which reduces handover failures and omits a beam refinement procedure by providing, at a time of performing a handover, a target base station with information on an optimal beam through which a random access is performed for the handover.

Accordingly, as an enhanced handover method in a mobile communication system, embodiments of the present disclosure also provide a handover method for efficiently utilizing uplink resources and reducing a handover interruption time, in which a terminal provides information on a handover execution time to a source base station and a target base station, and the source base station and the target base station synchronize their handover timing based on the provided information on the handover execution time.

Accordingly, as an enhanced handover method in a mobile communication system, embodiments of the present disclosure also provide a handover method in which information on system timing between a source base station and a target base station is provided to a terminal, and the terminal performs a random access to the target base station using the information on system timing or transmits an uplink message at an accurate timing without a random access procedure using the information on system timing.

In order to achieve the objective of the present disclosure, an operation method of a terminal for a handover in a mobile communication system may comprise performing measurement on beams of a target base station, and transmitting a measurement result of at least one beam of the target base station to a source base station; receiving, from the source base station, a handover command message including information on at least one Random Access Channel (RACH) resource for the at least one beam; transmitting a handover indication message including information on at least one random access target beam having an order of channel conditions determined based on a latest measurement to the source base station and to the target base station through the source base station; and determining an optimal beam among the at least one random access target beam, and transmitting a RACH to the target base station through a RACH resource allocated to the optimal beam.

The terminal may determine execution of the handover after receiving the handover command message.

The operation method may further comprise transmitting a RACH through a RACH resource allocated to a next priority beam among the at least one random access target beam, when a response to the RACH transmitted through the RACH resource allocated to the optimal beam is not received from the target base station.

The target base station may transmit the information on at least one RACH resource to the source base station by including the information on at least one RACH resource in a handover request acknowledgement message.

At least one RACH resource allocated to the at least one random access target beam may be reserved by the target base station after the target base station receives the handover indication message.

The handover indication message may further include buffer status information, a handover complete message, or Protocol Data Unit (PDU) reception state information of the terminal in order to reduce a handover interruption time.

In order to achieve the objective of the present disclosure, an operation method of a terminal for a handover in a mobile communication system may comprise performing measurement on a target base station, and transmitting a measurement result of at least one beam of the target base station to a source base station; receiving, from the source base station, a handover command message including a timing adjustment (TA) value to be used by the terminal for the target base station; determining a handover time, and transmitting a handover indication message including information on the determined handover time to the source base station and to the target base station through the source base station; and performing uplink transmission to the target base station at the handover time.

Handover timings of the terminal, the source base station, and the target base station may be synchronized based on the handover time.

Information on an uplink resource used for the uplink transmission may be received as included in the handover command message, and the uplink resource may be reserved based on the handover time after receiving the handover indication message from the target base station.

The information on an uplink resource used for the uplink transmission may be received from the target base station after the handover indication message is transmitted to the target base station.

The information on an uplink resource may include a starting time from which the uplink resource is available and a duration during which the uplink resource is valid.

The source base station may continue downlink transmission to the terminal until the handover time.

When the handover time is indicated by a period (T) from a time point at which the handover indication message is received at the source base station, the target base station may determine the handover time by using a value obtained by subtracting a latency of an interface between the source base station and the base station from the period (T).

The uplink transmission may be performed using the TA value without a random access procedure.

The handover indication message may further include buffer status information, a handover complete message, or Protocol Data Unit (PDU) reception state information of the terminal in order to reduce a handover interruption time.

In order to achieve the objective of the present disclosure, an operation method of a terminal for a handover in a mobile communication system may comprise performing measurement on a target base station, and transmitting a measurement result of at least one beam of the target base station to a source base station; receiving, from the source base station, a handover command message including system timing difference information between the source base station and the target base station; and deriving a system timing of the target base station from a system timing of the source base station by using the system timing difference information, and performing a random access to the target base station based on a Physical Random Access Channel (PRACH) configuration of the target base station and the derived system timing of the target base station.

The system timing difference information may include a difference between a system frame number (SFN) of the source base station and a SFN of the target base station.

The system timing difference information may include information indicating whether a SFN of the target base station is odd or even when a SFN of the source base station is odd or information indicating whether the SFN of the target base station is odd or even when the SFN of the source base station is even.

The system timing difference information may include a multiple of a predetermined unit time representing a difference between predetermined reference times of the source base station and the target base station.

The predetermined reference time may be a specific time boundary of the source base station.

According to the embodiments of the present disclosure, the terminal transmits information required for the target base station to execute a handover operation to the source base station, and the source base station may transmit the information to the target base station.

When the target base station supports multiple beams, the terminal transmits the beam measurement result to the target base station through the source base station at the time when the execution of the handover is determined. Accordingly, it is made possible to eliminate a handover interruption time due to a beam refinement procedure, and improve a service quality at the maximum data rate through the maximum beamforming gain as soon as the target base station is connected.

Also, in order to synchronize handover timings among the terminal, the source base station, and the target base station, the terminal transmits information on a handover time to the target base station through the source base station. Since the source base station can accurately know the handover time of the terminal, the source base station can transmit data to the terminal until the handover time of the terminal. Similarly, since the target base station can accurately know the handover time of the terminal, the target base station can transmit data from the handover time of the terminal. Therefore, the handover interruption time can be minimized and efficient resource utilization becomes possible.

BRIEF DESCRIPTION OF DRAWINGS

Embodiments of the present disclosure will become more apparent by describing in detail embodiments of the present disclosure with reference to the accompanying drawings, in which:

FIG. 10 is a flow chart for explaining a handover method in a mobile communication system according to a third embodiment of the present disclosure;

FIG. 11 is a conceptual diagram for explaining a difference between SFNs of source and target base stations in the LTE or NR mobile communication system;

DETAILED DESCRIPTION

Figure 1:
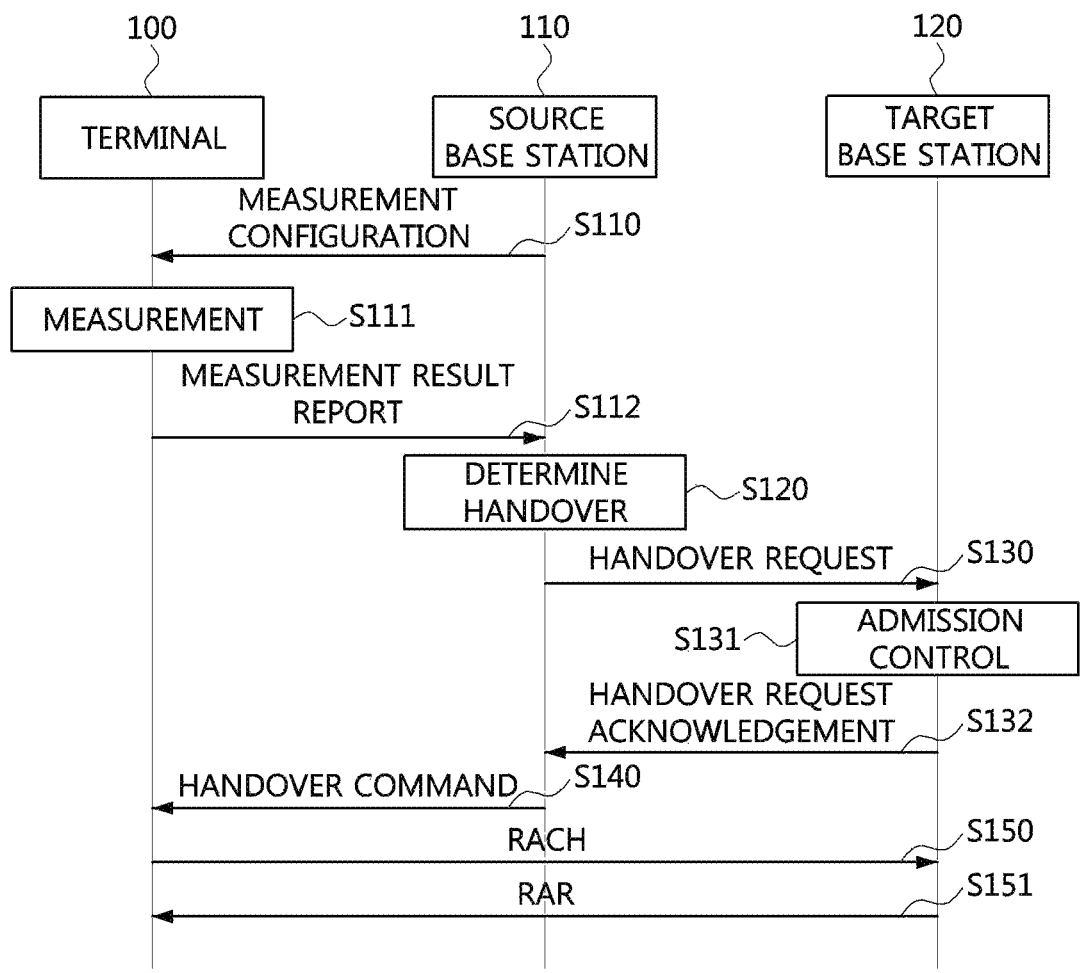
FIG. 1 is a flowchart illustrating an example of a handover method of an LTE or NR mobile communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, embodiments of the present disclosure will be described on the assumption that the embodiments are applied to the 3GPP LTE or NR mobile communication system for convenience of explanation. However, the embodiments of the present disclosure may be applied to other mobile communication systems.

Also, embodiments of the present disclosure will be described below with reference to an operation method of a terminal performing a handover. However, even when a method (e.g., transmission or reception of a signal or a message) performed at the terminal is described, a corresponding base station may also perform a method (e.g., reception or transmission of the signal or the message) corresponding to the method performed at the terminal. That is, when an operation of the terminal is described, the corresponding base station may perform an operation corresponding to the operation of the terminal. Conversely, when an operation of the base station is described, the corresponding terminal may perform an operation corresponding to the operation of the base station. Therefore, it should be understood that the embodiments of the present disclosure are applicable not only to the terminal but also to the base station.

Handover Based on Optimal Beam Information in a Multi-Beam Environment

FIG. 1 is a flowchart illustrating an example of a handover method of an LTE or NR mobile communication system.

The handover method illustrated in FIG. 1 is briefly reconstructed with reference to procedures necessary for explaining the embodiment of the present disclosure, and detailed procedures and subsequent procedures are omitted.

Referring to FIG. 1, a source base station 110 may perform a measurement configuration so that a terminal 100 performs measurement on neighbor base stations including a target base station 120 (S110). Here, the source base station 110 may provide information on measurement target beams for supporting the measurement of the terminal 100. Then, the terminal 100 may measure signal strengths of the neighbor base stations (S111) and report a measurement report to the source base station 110 (S112). The measurement result reported at this time may include not only a cell-level measurement result of the neighbor base stations but also a beam-level measurement result of the neighbor base stations.

Based on the received measurement result, the source base station 110 may determine a handover to the target base station 120 (S120), instruct the target base station to prepare for the handover by transmitting a handover request message to the target base station 120 (S130). Here, the source base station 110 may transmit the beam-level measurement result of the target base station 120 received from the terminal 100 to the target base station 120 by including it in the handover request message. Then, the target base station 120 may determine whether to accept the handover of the terminal through admission control (S131). If it is determined to accept the handover of the terminal, the target base station 120 may transmit a handover request acknowledgment message to the source base station 110 (S132). In the step S132, the target base station 120 may transmit information on at least one beam to be used for a random access procedure to the target base station 120 and at least one RACH resource used for the corresponding beam, which are determined based on the beam-level measurement result received from the terminal 100, by including the information in the handover request acknowledgment message.

The source base station 110 may transmit a handover command message to the terminal (S140). At this time, the handover command message may be transmitted as an RRC Connection Reconfiguration message, which is an RRC signaling message. Also, the handover command message may be transmitted as including the information on at least one beam to be used for a random access procedure and at least one RACH resource which has been received as included in the handover request acknowledgement message.

Upon receiving the handover command message, the terminal may immediately execute the handover. Accordingly, the terminal 100 may disconnect from the source base station 110 and attempt to connect to the target base station 120. The terminal may attempt a random access (RA) (i.e., transmission of a RACH) using the at least one beam and the RACH resource determined by the target base station, which are informed as included in the handover command message (S150). The target base station may transmit a random access response (RAR) in response to the RACH (S151).

Figure 2:
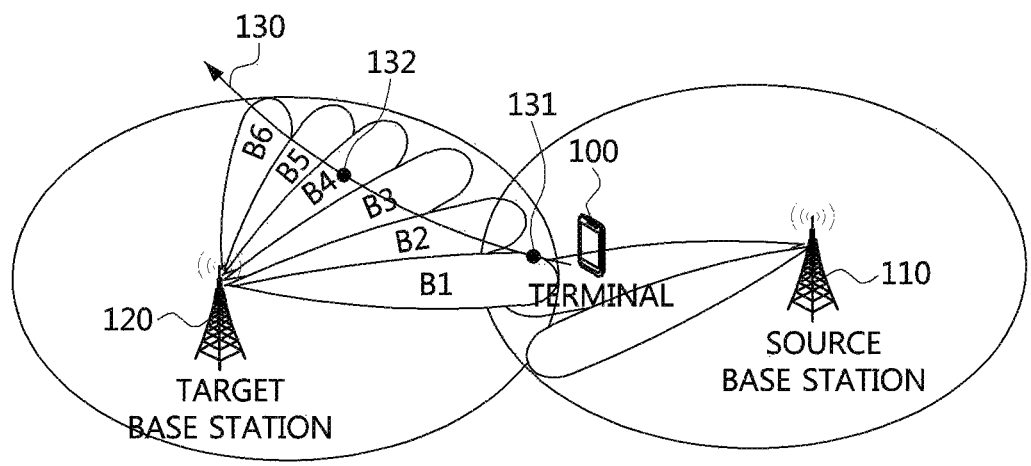
FIG. 2 is a conceptual diagram for explaining an example of a handover situation in a multi-beam environment in an NR mobile communication system.

FIG. 2 is a conceptual diagram for explaining an example of a handover situation in a multi-beam environment in an NR mobile communication system.

As described with reference to FIG. 1, since a beam environment of the target base station at the time of transmitting the measurement result (e.g., at the step S111) and a beam environment of the target base station at the time of execution of the handover (e.g., at a time after receiving the handover command message) may be different. In particular, when the terminal moves at high speed, the difference may be larger.

Referring to FIG. 2, it is assumed that the terminal 100 connected to the source base station 110 moves at a high speed in a predetermined direction 130. In this case, assuming that the terminal is located at a first point 131 at the time of transmitting the measurement result, beams B1, B2, B3, and B4 of the target base station 120 may be measured and reported as having signal strengths in an order of (B1>B2>B3>B4).

Accordingly, the target base station 120 receiving the beam-level measurement result may determine the beam B1 as an optimal beam to be used in the access procedure for the terminal, and determine the beam B2 as a next priority beam based on the beam-level measurement result of the terminal. Then, the target base station 120 may transmit the information on RACH resources to be used for the corresponding beams to the terminal 100 by including the information in the handover command message transmitted by the source base station 110.

However, assuming that the terminal receiving the handover command message is located at a second point 132 at the time of actually executing the handover, the signal strengths of the beams of the target base station may be changed to have an order of (B4>B3>B5>B2).

Despite the change in the signal strengths of the beams, the terminal may attempt to transmit a RACH through the optimal beam B1 determined by the target base station at the time of the handover execution. However, since the beam B1 is not an optimal beam for the terminal, the target base station may not receive the RACH transmitted from the terminal through the beam B1. Even if the target base station receives the RACH, the terminal may not receive a RAR transmitted in response to the RACH by the target base station. Thus, if a RAR is not received for a predetermined time while RAs are repeated through the beam B1, the handover will fail.

Alternatively, after the RAs are repeated a predetermined number of times through the beam B1 and the RAR is not received, the terminal 100 may retry the RA through the beam B2 which is the next priority beam. However, although the beam B2 has a better channel condition than the beam B1, it still has a poor channel condition as compared to the beam B4 which is the optimal beam at the second point 132. Therefore, when the handover fails or even when the handover is successful by receiving the RAR, the handover interruption time may be increased due to a beam refinement procedure for changing the beam of the terminal to the beam B4 which is the optimal beam, and a quality of service may be degraded due to a low transmission rate before the reallocation to the beam B4.

Figure 3:
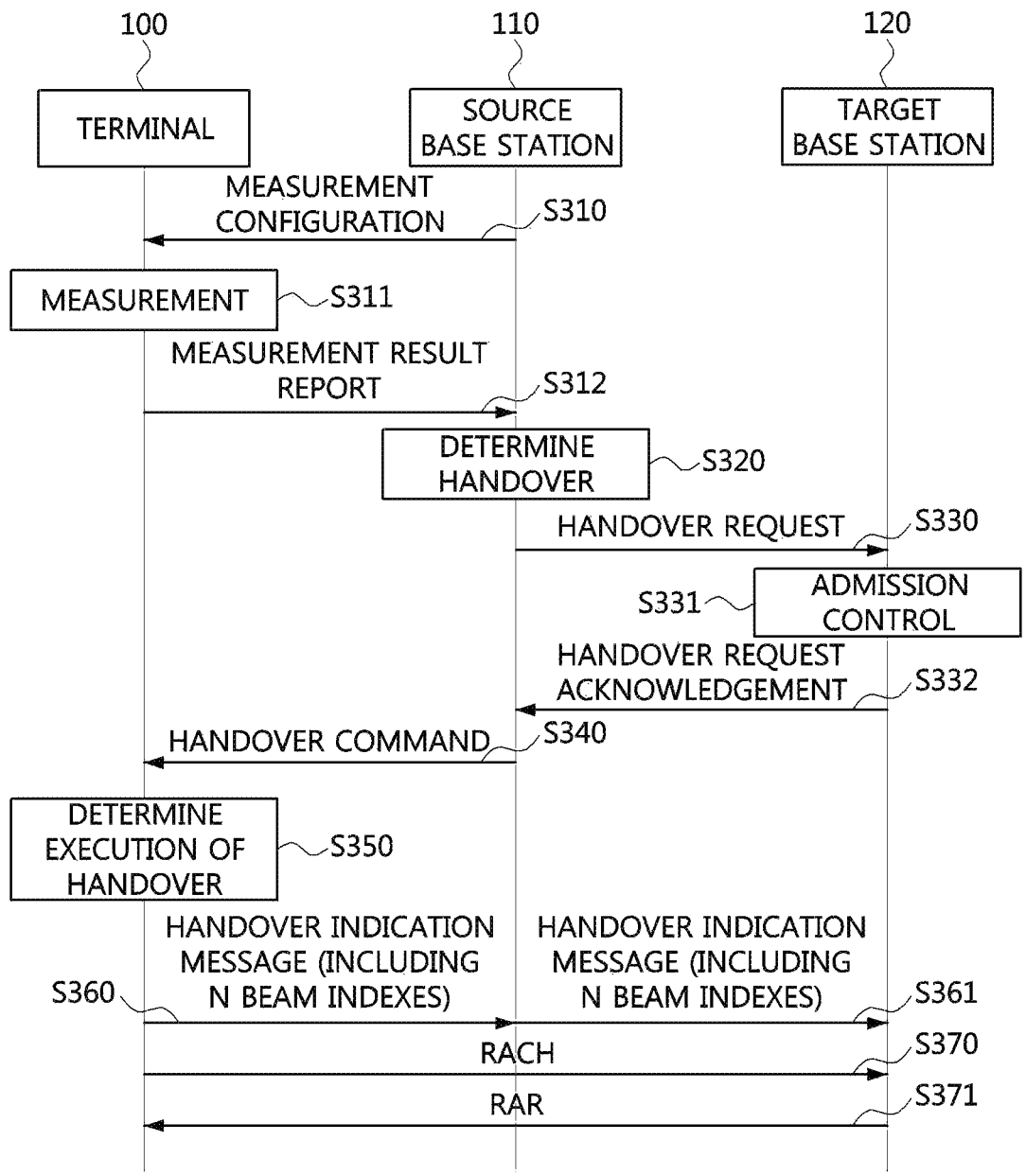
FIG. 3 is a flow chart for explaining a handover method in a mobile communication system according to a first embodiment of the present disclosure.

FIG. 3 is a flow chart for explaining a handover method in a mobile communication system according to a first embodiment of the present disclosure.

The handover method illustrated in FIG. 3 is briefly reconstructed with reference to procedures necessary for explaining the embodiment of the present disclosure, and detailed procedures and subsequent procedures are omitted.

Referring to FIG. 3, steps S310 to S340 of a handover method according to a first embodiment of the present disclosure may be identical to the steps S110 to S140 constituting the handover method of the general LTE or NR mobile communication system described with reference to FIG. 1.

That is, the terminal 100 may measure signal strengths of neighbor base stations according to a measurement configuration (S310) of the source base station 110 (S311), and report a measurement result to the source base station (S312). The measurement result may include a cell-level measurement result of the neighbor base stations as well as a beam-level measurement result of the neighbor base stations. Based on the measurement result received from the terminal, the source base station 110 may determine whether to handover the terminal to the target base station 120 (S320), and instruct the target base station to prepare for the handover by transmitting a handover request message to the target base station (S330). Here, measurement results of at least one beam of the target base station may be included in the handover request message and transmitted to the target base station. The target base station may determine whether to accept the handover of the terminal (S331), and transmit a handover request acknowledgment message to the source base station when it is determined to accept the handover (S332). Here, the target base station 120 may transmit a message to be transmitted to the terminal to the source base station 110. This message may include information on at least one beam to be used by the terminal for an access procedure which is determined based on the measurement result of at least one beam of the target base station and RACH resources to be used for the corresponding beam. The source base station may transmit a handover command message to the terminal and instruct the terminal to perform handover (S340).

After receiving the handover command message, the terminal may determine execution of the handover (S350). Then, based on a latest beam measurement result for the target base station, the terminal may determine at least one beam (i.e., random access target beam) to be used for the terminal to access the target base station. The at least one random access target beam may be N (N is a natural number equal to or larger than 1) beams having respective priorities. The terminal may transmit a handover indication message including beam indexes designating N random access target beams to the source base station (S360). Meanwhile, the handover indication message may further include buffer status information, a handover complete message, or Protocol Data Unit (PDU) reception state information of the terminal in order to reduce the handover interruption time.

Upon receiving the handover indication message, the source base station 110 may recognize that the terminal 100 is to execute the handover to the target base station 120, and transmit information (or the handover indication message itself) required for the handover of the terminal to the target base station (S361). The handover indication message transmitted by the terminal may include N beam indexes designating the at least one random access target beam to be used for the random access to the target base station determined based on the beam-level measurement result of the target base station.

The terminal 100 may determine an optimal beam to be used for the random access to the target base station preferentially among the at least one random access target beam. Based on the information on the RACH resources allocated to the at least one random access target beam, which is received as included in the handover command message, the terminal may identify a RACH resource allocated to the optimal beam and transmit a RACH to the target base station by using the identifier RACH resource (S370). The terminal may receive a RAR for the transmitted RACH from the target base station (S371).

For example, it may be assumed that the signal strengths of the beams of the target base station are reported as having an order of (B1>B2>B3>B4) at the time of transmitting the measurement result (S312). Based on the beam-level measurement result of the terminal, the target base station may transmit a message including information on the RACH resources to be used for the corresponding beams to the terminal through the source base station. Here, the target base station does not have to reserve the RACH resources to be used for the corresponding beams for the terminal.

It may be assumed that the signal strengths of the beams of the target base station are measured as having an order of (B4>B3>B5>B2) in a measurement performed after receiving the handover command message and determining execution of the handover. The terminal may transmit a handover indication message including N beam indexes having the order of (B4>B3>B5>B2) to the source base station (S360). The source base station may transmit the handover indication message to the target base station (S361), and the target base station may reserve the RACH resources to be used for the corresponding beams for the terminal. In this manner, the RACH resources can be reserved at the actual handover execution time and radio resources can be used efficiently. That is, although the target base station transmits information on the RACH resources to the terminal through the source base station in the step S332, the target base station may use the corresponding RACH resources for other purposes before receiving the handover indication message from the terminal. After receiving the handover indication message, the RACH resources may be reserved dedicatedly for the random access for handover of the terminal.

However, in spite of the waste of resources, the target base station may reserve the RACH resources for the random access for the handover of the terminal in advance before receiving the handover indication message.

The terminal 100 may attempt to perform the RA for the target base station 120 through the optimal beam B4 determined by itself in the latest measurement. Since the beam B4 has the best channel condition, in most cases, there is no case that the target base station does not receive the RACH or the terminal does not receive a RAR transmitted in response to the RACH. If the random access through the beam B4, which is the optimal beam, fails, the terminal 100 may retry the random access to the target base station 120 using the beam B3 which is the next priority beam.

Since the terminal 100 can be allocated the optimal beam B4 as soon as the handover is performed to the target base station 120, it is made possible to eliminate a handover interruption time due to a separate beam refinement procedure, and a service quality can be improved with a higher data rate by achieving the maximum beamforming gain.

Handover Based on Handover Time Point Information

As described above, the handover interruption time can be reduced when the RACH-less handover of omitting the RACH transmission procedure for the target base station and directly transmitting the uplink message is performed. In the RACH-less handover, the terminal should receive allocation information on an uplink resource used for transmitting the uplink message in order to directly transmit the uplink message.

One method for this is a method in which the target base station transmits the allocation information of the uplink resource to the source base station and this information is transmitted to the terminal as in included in the handover command message. Another method for this is a method in which the target base station transmits the allocation information of the uplink resource allocation at the time of handover of the terminal and the terminal receives the allocation information of the uplink resource. However, since the target base station does not know the actual handover time of the terminal, the target base station should reserve the uplink resource in advance by estimating the handover time of the terminal, and thus the uplink resource may be wasted.

Figure 4:
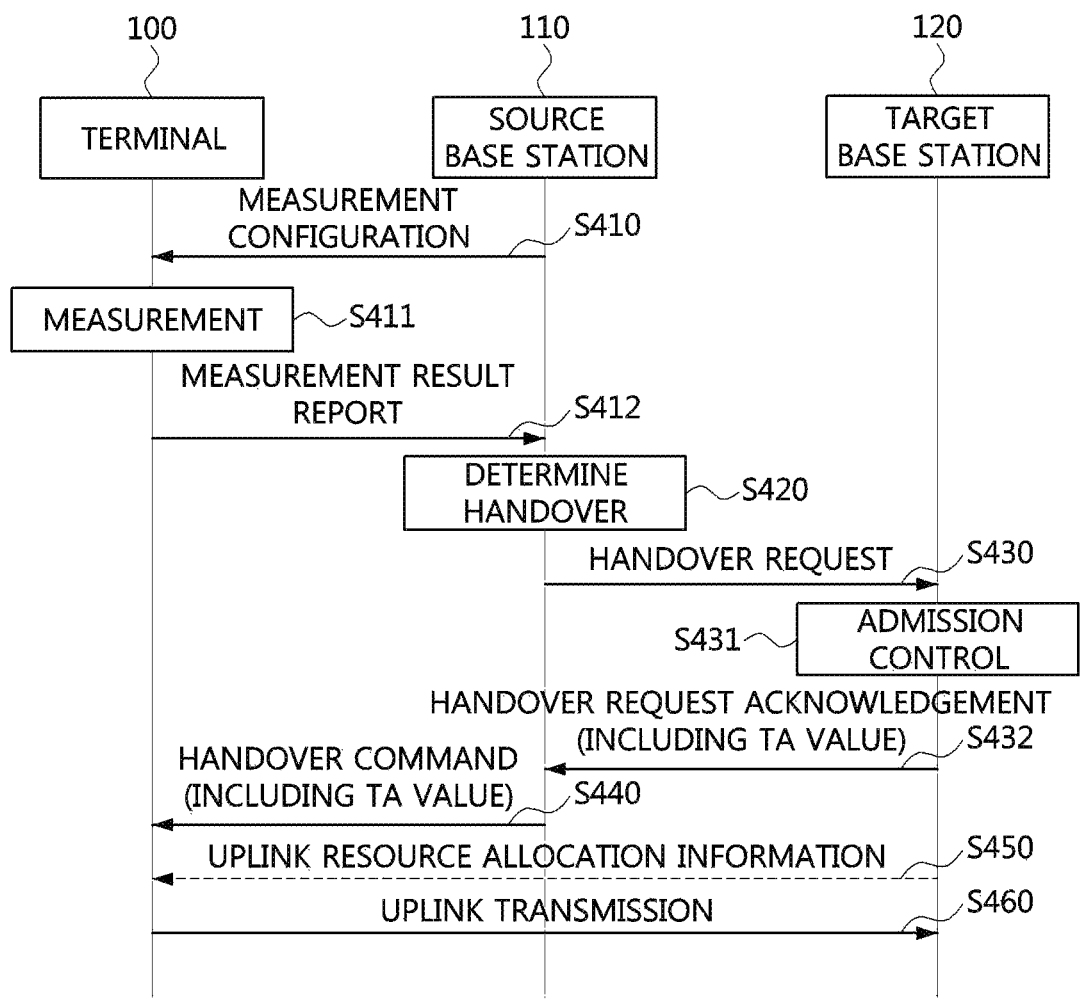
FIG. 4 is a flow chart for explaining an example of a RACH-less handover method of a LTE or NR mobile communication system.

FIG. 4 is a flow chart for explaining an example of a RACH-less handover method of a LTE or NR mobile communication system.

The handover method illustrated in FIG. 4 is briefly reconstructed with reference to procedures necessary for explaining the embodiment of the present disclosure, and detailed procedures and subsequent procedures are omitted.

Referring to FIG. 4, similarly to the case of FIG. 1, the terminal 100 may measure signal strengths of neighbor base stations according to a measurement configuration (S410) of the source base station 110 (S411), and report a measurement result to the source base station (S412). Based on the measurement result received from the terminal, the source base station 110 may determine whether to handover the terminal to the target base station 120 (S420), and instruct the target base station to prepare for the handover by transmitting a handover request message to the target base station (S430). The target base station may determine whether to accept the handover of the terminal (S431), and transmit a handover request acknowledgment message to the source base station when it is determined to accept the handover (S432).

In this case, when the terminal supports the RACH-less handover, the target base station 120 may include a timing adjustment (TA) value to be used by the terminal for the target base station in the handover request acknowledgment message. Also, the handover request acknowledgment message may further include allocation information of uplink resources (hereinafter, 'uplink resource allocation information') for uplink transmission of the terminal.

The source base station may transmit a handover command message to the terminal to instruct the terminal to execute the handover (S440). Here, the handover command message may be an RRC connection reconfiguration message as an RRC signaling message. The handover command message may include the TA value received from the target base station. Also, the handover command message may further include the uplink resource allocation information for uplink transmission.

Upon receiving the handover command message, the terminal may immediately execute the handover, disconnect from the source base station, and attempt to access the target base station. When the pre-allocated uplink resources are valid, the terminal may transmit an uplink message (e.g., a handover complete message) through the uplink resources by applying the TA value received as included in the handover command message and complete the execution of the handover (S460).

On the other hand, when there is no uplink resource allocation information previously received (i.e., when the uplink resource allocation information is not included in the handover request acknowledge message and the handover command message in the steps S432 and S440), the terminal may receive uplink resource allocation information from the target base station (S450), and transmit an uplink message (e.g., handover complete message) through uplink resources indicated by the received uplink resource allocation information and complete the handover (S460).

Figure 5:
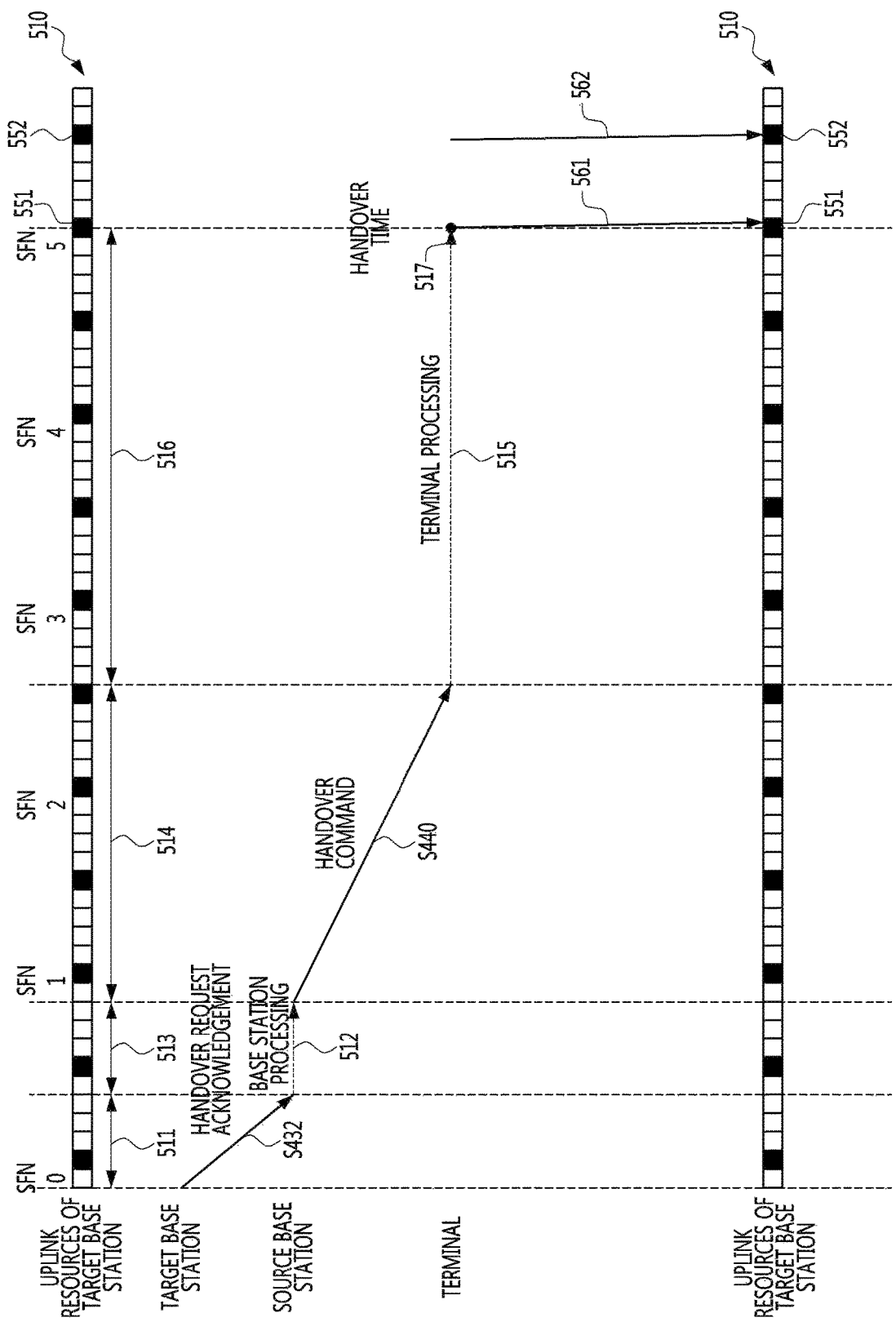
FIG. 5 is a conceptual diagram for explaining handover interruption time and uplink resource inefficiency in the RACH-less handover of an LTE or NR mobile communication system.

FIG. 5 is a conceptual diagram for explaining handover interruption time and uplink resource inefficiency in the RACH-less handover of an LTE or NR mobile communication system.

Referring to FIG. 5, uplink resources 510 of the target base station, including uplink subframes and system frames, are illustrated. 10 subframes constitute one system frame, and each system frame is indicated by a system frame number (SFN). In FIG. 5, 6 system frames ranging from SFN 0 to SFN 5 are shown.

Meanwhile, a latency of an interface (e.g., X2 interface) between the source base station and the target base station is assumed to be about 5 ms, and a handover request acknowledge message processing time of the source base station is assumed to be about 5 ms. Also, it is assumed that the handover command message is received at the terminal through two HARQ retransmissions, and thus the transmission and reception of the handover command message take about 16 ms. Also, it is assumed that a handover command message processing of the terminal takes a specific time.

That is, when the target base station transmits a handover request acknowledgment message to the source base station (S432), it is received at the source base station after the latency of the interface 511. Also, the source base station may process the handover request acknowledgment message received from the target base station during a time indicated by 512 and terminate the processing after a time indicated by 513. The source base station having completed the processing of the handover request acknowledgement message may transmit a handover command message to the terminal (S440). In FIG. 5, it is assumed that the handover command message is received at the terminal after two HARQ retransmissions. Therefore, a time 514 of approximately 16 ms is required to receive the handover command message.

The terminal receiving the handover command message may process the received handover command message (515). The handover command message processing time of the terminal differs depending on the capability of the terminal and it may take a time indicated by 516. Therefore, an actual handover time (517, handover timing) of the terminal may be located within a second subframe 551 of SFN 5 among the uplink resources 510 of the target base station.

Meanwhile, since the target base station does not know the actual handover time of the terminal in advance, the target base station may periodically reserve uplink resources for the terminal after transmitting the handover request acknowledgment message to the source base station. That is, among the uplink resources 510 shown in FIG. 5, subframes filled with black indicate the uplink resources reserved for uplink transmission of the terminal.

At the actual handover time 517 within the second subframe 551 of SFN 5, the terminal may receive allocation information of a first uplink resource reserved in a seventh subframe 552 after the handover time from the target base station, and complete the handover by transmitting the handover complete message to the target base station through the uplink resource in the subframe 552 (562). Meanwhile, if the uplink resource allocation information is received by the terminal as included in the handover request acknowledgment message and the handover command message, the terminal may perform the uplink transmission in the second subframe 551 of SFN 5 (561).

As a result, in the situation illustrated in FIG. 5, the uplink resources for RACH-less handover may be wasted 10 times or 11 times. That is, the uplink resources may be wasted from the second subframe of SFN 0 to the seventh subframe of SFN 4, or may be wasted from the second subframe of SFN 0 to the second subframe 551 of SFN 5.

Also, the handover interruption time may be 5 ms (from the handover time to the time when the handover complete message is transmitted to the target base station) when the source base station continues to transmit data to the terminal even after transmitting the handover command message to the terminal. However, in a typical implementation, since the source base station does not know the handover time of the terminal correctly, the data transmission to the terminal is stopped after the handover command message is transmitted to the terminal. In this case, the handover interruption time may be 42 ms or 47 ms.

Figure 6:
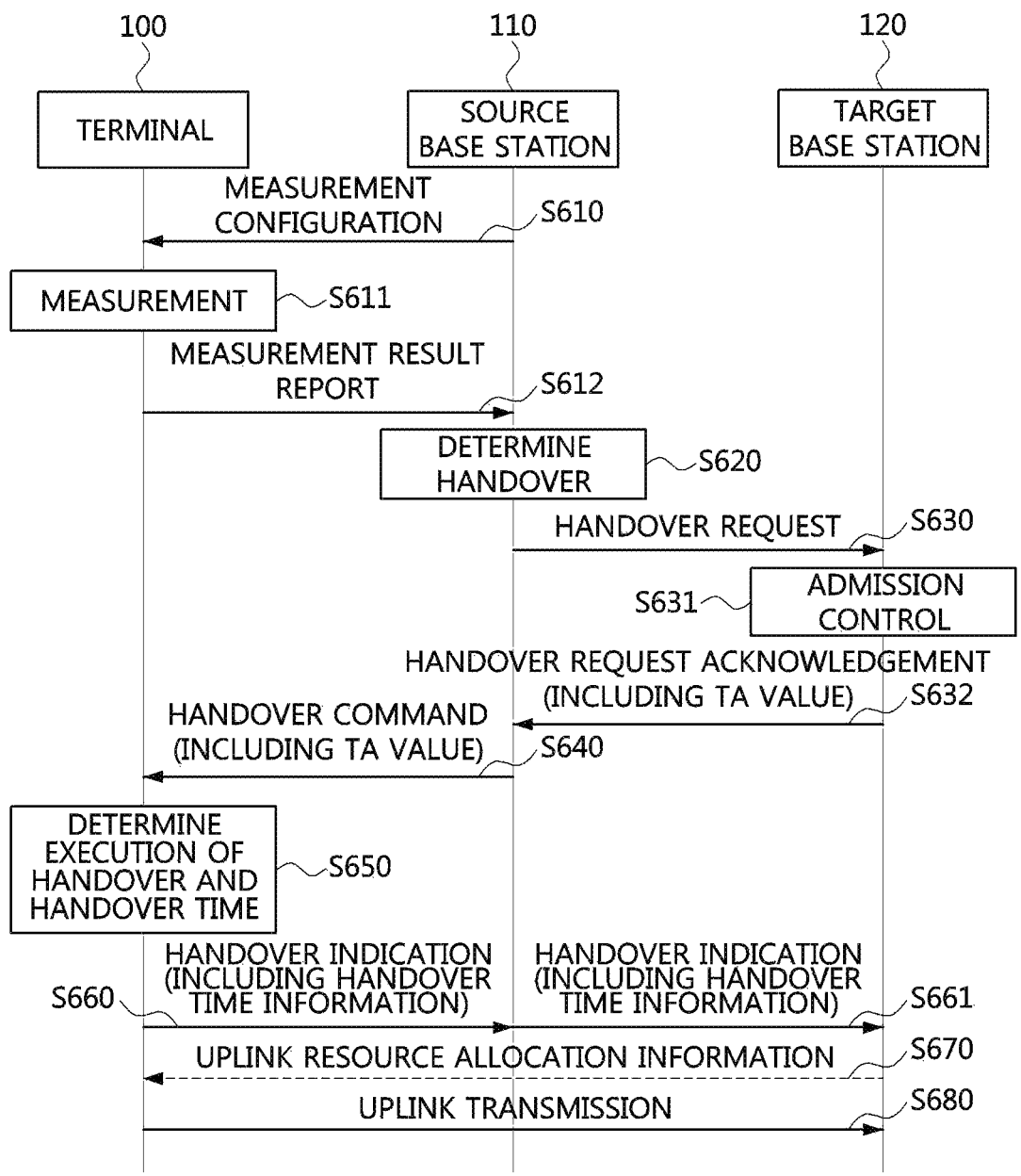
FIG. 6 is a flow chart for explaining a handover method in a mobile communication system according to a second embodiment of the present disclosure.
Figure 7:
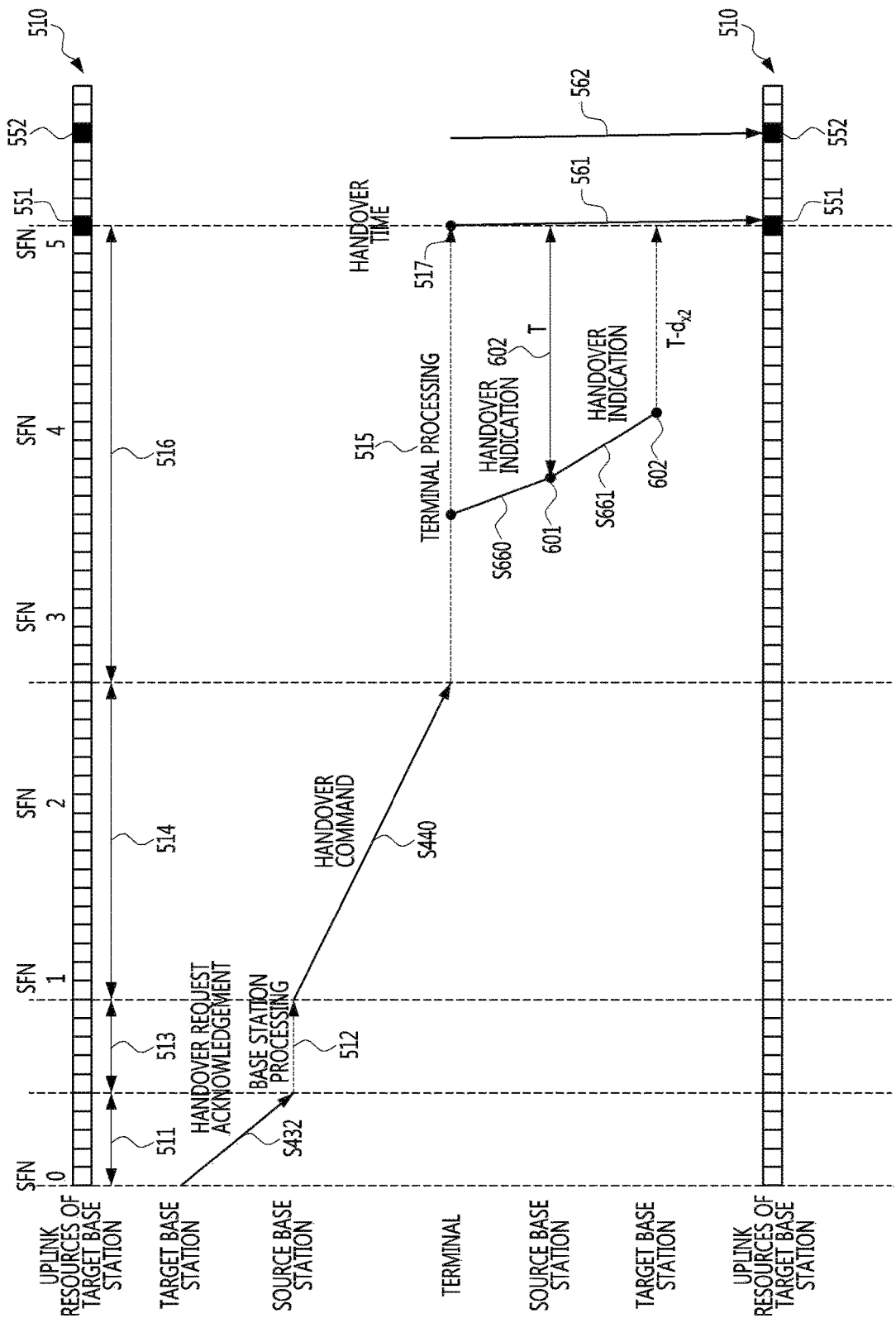
FIG. 7 is a conceptual diagram for explaining handover interruption time reduction and uplink resource efficiency according to the second embodiment of the present disclosure.

FIG. 6 is a flow chart for explaining a handover method in a mobile communication system according to a second embodiment of the present disclosure, and FIG. 7 is a conceptual diagram for explaining handover interruption time reduction and uplink resource efficiency according to the second embodiment of the present disclosure.

The handover method illustrated in FIG. 6 is briefly reconstructed with reference to procedures necessary for explaining the embodiment of the present disclosure, and detailed procedures and subsequent procedures are omitted.

Referring to FIG. 6, similarly to the case of FIG. 4, the terminal 100 may measure signal strengths of neighbor base stations according to a measurement configuration (S610) of the source base station 110 (S611), and report a measurement result to the source base station (S612). Based on the measurement result received from the terminal, the source base station 110 may determine whether to handover the terminal to the target base station 120 (S620), and instruct the target base station to prepare for the handover by transmitting a handover request message to the target base station (S630). The target base station may determine whether to accept the handover of the terminal (S631), and transmit a handover request acknowledgment message to the source base station when it is determined to accept the handover (S632). Also, the source base station receiving the handover request acknowledgement message from the target base station may transmit a handover command message to the terminal to instruct the terminal to execute the handover (S640).

Then, the terminal receiving the handover command message may determine execution of the handover and a handover time at which the handover is to be actually performed (S650), and transmit a handover indication message including information on the determined handover time to the source base station (S660). Also, the source base station may transmit the handover indication message received from the terminal to the target base station (S661). Meanwhile, the handover indication message may further include buffer status information, a handover complete message, or PDU reception state information of the terminal in order to reduce the handover interruption time.

Referring to FIG. 7, the handover time 517 may be indicated by a duration (T) 602 from a time point 601 at which the handover indication message is received at the source base station to the handover time 517. This may be a value that the terminal determines based on the processing capability of the terminal itself.

The source base station may receive the handover indication message from the terminal (S660), and may synchronize handover timing with the terminal using the handover time included in the received handover indication message. Similarly, the target base station may receive the handover indication message from the source base station (S661), and may synchronize handover timing with the terminal and the source base station using the handover time included in the handover indication message.

For example, the target base station may determine the handover time 517 to be a time point after a time $(T-d_{x2})$ from the time point 602 at which the target base station receives the handover indication message from the source base station, and synchronize its handover timing with the terminal and the source base station. Here $d_{x2}$ is the latency of the interface (e.g., X2 interface) between the source base station and the target base station. In this way, the handover timing between the terminal and the source base station may be synchronized, and the handover timing between the target base station and the terminal may be synchronized.

When the pre-allocated uplink resources are valid, the terminal transmitting the handover indication message may transmit an uplink message (e.g., a handover complete message) through the uplink resources by applying the TA value for the target base station received as included in the handover command message, and complete the handover (S680).

On the other hand, when there is no uplink resource allocation information of uplink resources previously received, the terminal may receive the allocation information of uplink resources from the target base station (S670), and transmit an uplink message (e.g., a handover complete message) through the uplink resources indicated by the received allocation information and complete the handover (S680).

Meanwhile, the uplink resource allocation information received from the target base station may further include information on a start time at which the uplink resources can be used and a validity period during which the uplink resources are valid. This will be described later in a fourth embodiment of the present disclosure with reference to FIG. 13.

Hereinafter, improvement on the handover interruption time and uplink resource inefficiency illustrated in FIG. 5 will be described with reference to FIG. 7.

In FIG. 7, descriptions of the same reference numerals as those used in FIG. 5 are omitted, and the assumption on the interface (e.g., X2 interface) latency between the source base station and the target base station, the handover request acknowledgement message processing time of the source base station, the time required for the base station to receive the handover command message, and the handover command message processing time of the terminal are also the same as those of FIG. 5.

As compared to the case of FIG. 5, the terminal having received the handover command message may first determine the actual handover time 517 of the terminal, and transmit information on the determined handover time to the source base station by including the information in the handover indication message (S660). As described above, the handover command message processing time of the terminal differs depending on the capabilities of the terminal. Similarly to the case of FIG. 5, the actual handover time 517 of the terminal may be located within the second subframe 551 of the SFN 5 belonging to the uplink resources 510 of the target base station.

The source base station may receive the handover indication message from the terminal and synchronize handover timing with the terminal using the information on the handover time included in the received handover indication message. Similarly, the target base station may synchronize handover timing with the terminal and the source base station using the information on the handover time included in the handover indication message received from the source base station.

For example, the target base station may determine the handover time 517 to be a time point after a time $(T-d_{x2})$ from the time point 602 at which the target base station receives the handover indication message from the source base station, and synchronize its handover timing with the terminal and the source base station. Here $d_{x2}$ is the latency of the interface (e.g., X2 interface) between the source base station and the target base station. In this way, the handover timing between the terminal and the source base station may be synchronized, and the handover timing among the terminal, the target base station and the source base station may be synchronized.

Also, unlike the case of FIG. 5, since the handover timing of the terminal, the source base station, and the target base station are synchronized based on the handover time information included in the handover indication message, the terminal may perform the uplink transmission at the handover time.

For example, when the uplink resources allocated through the handover command message are valid, the terminal may transmit an uplink message (e.g., a handover complete message) through the uplink resources (e.g., the resource in the uplink subframe 551) by applying the TA value for the target base station received as included in the handover command message, and complete the handover (S680).

On the other hand, when there is no uplink resource allocation information previously received, the terminal may receive the uplink resource allocation information from the target base station (S670), and transmit an uplink message (e.g., a handover complete message) through the uplink resources (e.g., the resource in the uplink subframe 552) indicated by the received uplink resource allocation information and complete the handover (S680).

Figure 8:
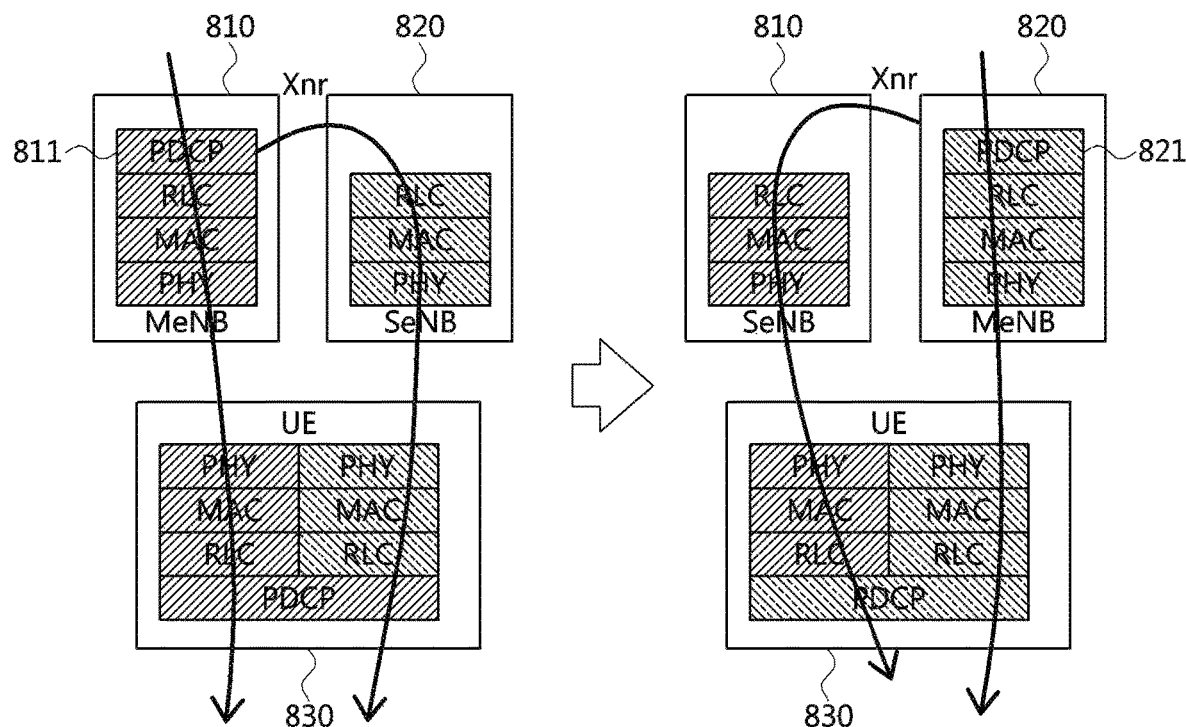
FIG. 8 is a conceptual diagram for explaining a role change between a master base station and a secondary base station in a dual connectivity (DC) environment.

FIG. 8 is a conceptual diagram for explaining a role change between a master base station and a secondary base station in a dual connectivity (DC) environment.

Referring to FIG. 8, a dual connectivity (DC) environment in which a terminal simultaneously maintains connections with two base stations including a first bases station (e.g., master base station (MeNB)) and a second base station (e.g., secondary base station (SeNB)).

The terminal may be transitioned from a state in which the first base station 810 operates as a MeNB and the second base station 820 operates as a SeNB to a state in which the second base station 820 operates as a MeNB and the first base station 810 operates as a SeNB. Such the state transition may be expressed as a role change of the base stations. This role change may be performed according to a handover procedure.

Also in this case, the handover timing synchronization scheme of the handover method according to the second embodiment of the present disclosure described above may be applied, so that an interruption time due to the role change can be completely eliminated.

For example, in the process of changing roles of MeNB and SeNB, relocation of Packet Data Convergence Protocol (PDCP) layers 811 and 821 may occur and security keys for them should be changed. That is, a state transition should occur from a state in which the PDCP layer 821 of the first base station 810 performs the PDCP layer functions of both the first base station 810 and the second base station 820 to a state in which the PDCP layer 821 of the second base station 820 performs the PDCP layer functions of both the first base station 810 and the second base station 820.

Since the first base station 810 and the second base station 820 do not know the exact time at which the terminal 830 performs the actual role change, the first base station 810 and the second base station 820 should separately transmit a PDCP PDU using a security key of the first base station 810 which is the MeNB before the role change and a PDCP PDU using a security key of the second base station 820 which is the MeNB after the role change.

Accordingly, in order to solve such the problem, the terminal 830 may first determine an actual role change time of the terminal, and transmit information on the determine role change time to the first base station 810, which is the MeNB before the role change, as included in a handover indication message. Also, the first base station 810 may transmit the handover indication message received from the terminal to the second base station 820 which is the SeNB.

The role change time may be indicated by a time (T) from the time at which the handover indication message is received by the first base station 810 to the role change time. This may be a value that the terminal determines based on the processing capability of the terminal itself.

The first base station 810 may receive the handover indication message from the terminal 830 and synchronizes role change timing with the terminal 830 using the information on the role change time included in the received handover indication message. Similarly, the second base station 820 may synchronize role change timing with the terminal 830 and the first base station 810 using the information on the role change time included in the handover indication message received through the first base station 810.

For example, the second base station 820 may determine the role change time to be a time point after a time $(T-d_{x2})$ from the time point at which the second base station receives the handover indication message from the first base station 810, and synchronize its role change timing with the terminal 830 and the first base station 810. Here $d_{x2}$ is the latency of the interface (e.g., X2 interface) between the first base station 810 and the second base station 820. In this way, the role change timing between the terminal and the first base station may be synchronized, and the role change timing between the second base station and the terminal may be synchronized.

The conditional handover has been discussed for NR handover mechanism in the 3GPP. Since a channel environment is rapidly changed and a blockage due to obstacles is likely to occur in high frequency bands of above 6 GHz, in the conditional handover, a handover preparation operation may be performed in advance, and a terminal may receive a handover command message in advance when the channel condition is stable. Upon receiving the handover command message, the terminal may not immediately execute the handover. That is, after receiving the handover command message, when a specific handover execution event occurs, the terminal may determine a target base station and an actual handover execution time based on the handover command message previously received by the terminal so that the handover can be performed quickly and handover failures can be reduced. The above-described first and second embodiments may belong to handover methods based on such the conditional handover.

Figure 9A:
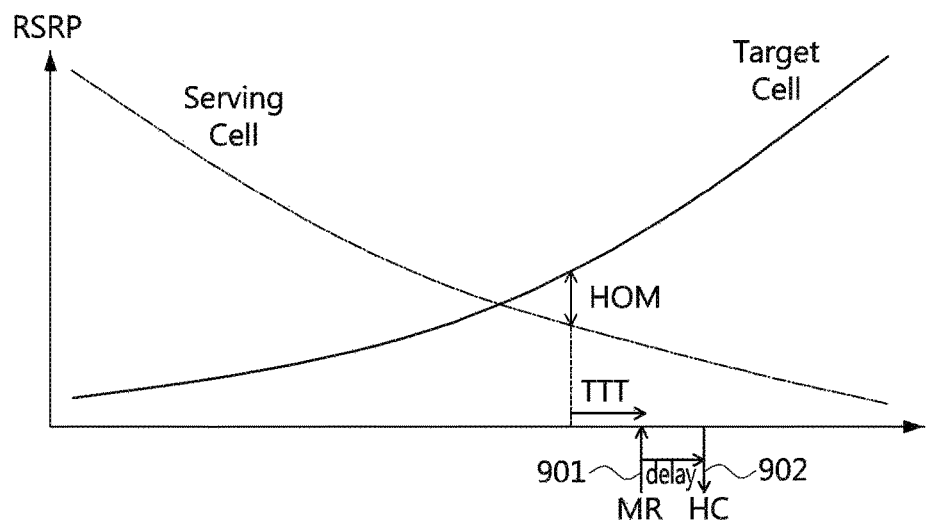
FIGS. 9A and 9B are conceptual diagrams for comparing handover timings of a conventional handover in the conventional LTE mobile communication system and a conditional handover.
Figure 9B:
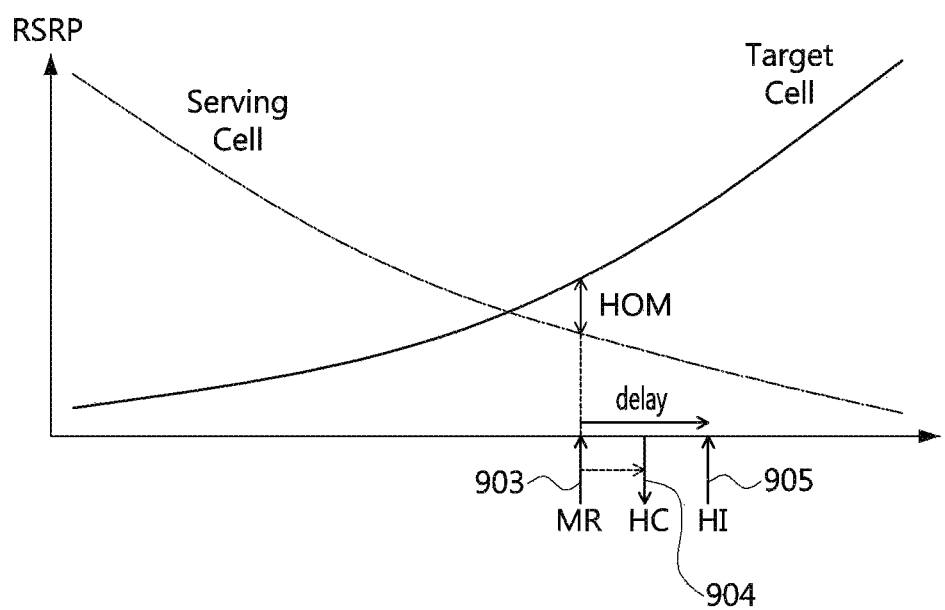

FIGS. 9A and 9B are conceptual diagrams for comparing handover timings of a conventional handover in the conventional LTE mobile communication system and a conditional handover.

Referring to FIG. 9A, according to the conventional handover method of the conventional LTE mobile communication system, if a state in which a signal strength difference between a source base station and a target base station is equal to or greater than a handover margin (HOM) is maintained during a predetermined time (i.e., Time-to-Trigger (TTT)), a measurement report (MR) of the terminal is performed, and the terminal may receive a handover command (HC) from the source base station.

In this case, a sum of a handover preparation time from the measurement reporting time point 901 to the time point 902 at which the terminal receives the handover command message and a time required to perform the actual handover after the terminal receives the handover command message is about several tens of milliseconds, which is predictable and is not a relatively long time.

On the other hand, referring to FIG. 9B, according to the conditional handover method of the NR mobile communication system, when a signal strength difference between the source base station and the target base station becomes equal to or greater than a handover margin (HOM), the terminal may immediately perform a measurement report (MR) to the source base station without determining whether or not the signal strength difference is maintained as equal to or greater than the HOM during the TTT, and receive a handover command (HC) from the source base station. Also, when a specific handover execution event occurs after receiving the handover command, the terminal may transmit a handover indication message (HI) to the source base station, and execute the handover based on the handover command message previously received from the source base station.

In the case of the conditional handover, a handover preparation time from a measurement reporting time point 903 to the a time point 904 at which the handover command message is received may be the same as the handover preparation time of the conventional LTE mobile communication system, but a time from the time point 904 to an actual handover execution time of the handover may vary according to mobility speed and channel condition of the terminal and may be a relatively long time.

Therefore, when the conditional handover is supported, it is necessary to execute the handover by reflecting the handover timing synchronization between the terminal and the base stations and the latest cell-level and beam-level measurement results of the terminal. In the embodiments of the present disclosure, the terminal supporting the conditional handover may transmit the handover indication message including the necessary information to the source base station at the time of actually executing the handover according to the occurrence of the specific handover execution event. Here, the handover indication message may reflect the latest cell-level measurement result of the terminal including the determined target base station, and may include at least one beam indexes of optimal beams (i.e., random access target beams) by reflecting the latest beam-level measurement results of the terminal. Also, the handover indication message may include information on an actual handover time so as to synchronize the handover timing between the terminal, the source base station, and the target base station.

As another embodiment of the present disclosure, in a handover scenario of carrier-aggregation (CA) in which a secondary cell is changed to a primary cell, the handover indication message may be transmitted to the source base station in order to notify the handover time. Similarly, the handover indication message may include information on the handover time so that the handover timing between the terminal and the base stations can be synchronized.

As yet another embodiment of the present disclosure, the terminal may transmit information to be transmitted to the target base station to the source base station by including the information in the handover indication message transmitted to the source base station. For example, the information to be transmitted to the target base station, such as buffer status information, a handover complete message, or PDU reception state information of the terminal, may be transmitted to target base station in advance through the source base station. Through this, the interruption time which may occur during execution of the handover may be reduced.

Handover Based on System Timing Difference Information

In general, when source and target base stations are different, SFNs, frame boundaries, or subframe boundaries of the source and target base stations may be different from each other. The frame boundaries and subframe boundaries of the target base station can be known through downlink synchronization. The downlink synchronization may be performed when measuring the target base station or performing a handover to the target base station. However, in the LTE mobile communication system, in order to reduce power consumption and reduce handover delay time, the terminal does not decode a Master Information Block (MIB) including SFN information of the target base station when the terminal performs measurement and handover.

Accordingly, the terminal may attempt a random access by transmitting a RACH for handover in a state in which the SFN of the target base station is unknown. At this time, a problem may occur when the target base station is configured to receive a RACH only in even-numbered SFNs (e.g., PRACH configuration 0).

That is, since the terminal does not decode the MIB of the target base station, the terminal cannot know whether the SFN of the target base station is even-numbered or odd-numbered, and thus transmit a RACH irrespective of the SFN of the target base station. In case that the terminal transmits the RACH irrespective of the SFN of the target base station (e.g., the terminal transmits the RACH in the odd-numbered system frame in spite of the PRACH configuration 0), a handover failure may occur due to an uplink interference or a failure of the random access.

Figures 12, 13:
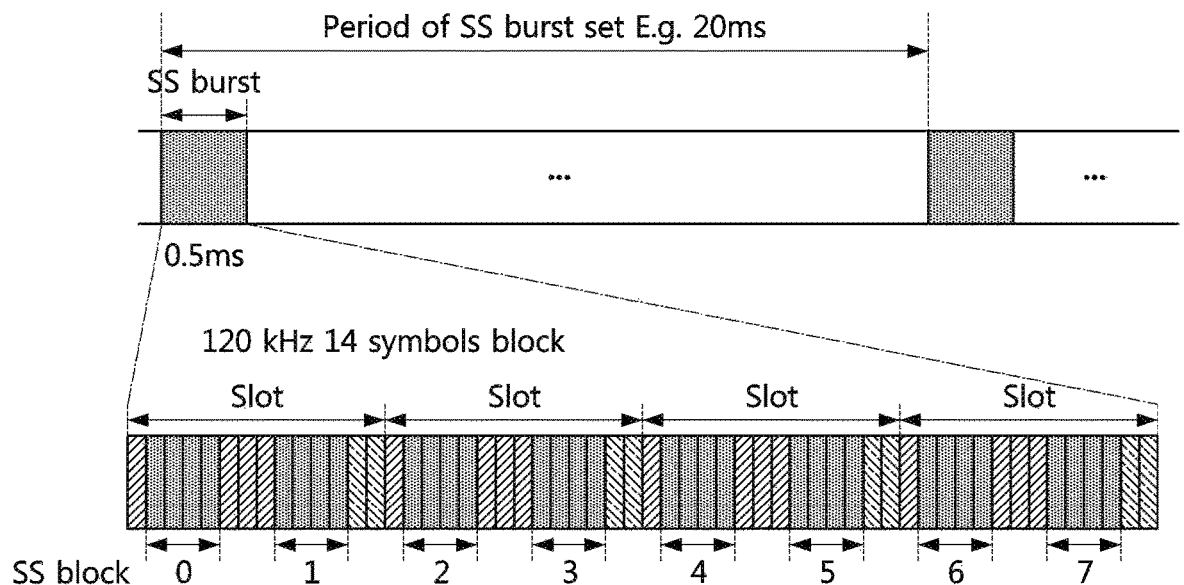
FIG. 12 is a conceptual diagram for explaining a configuration example of a SS burst in which downlink synchronization signals and PBCHs are transmitted.
FIG. 13 is a conceptual diagram for explaining uplink resource allocation information which can be used for uplink transmission in a RACH-less handover method according to a fourth embodiment of the present disclosure.

FIG. 10 is a flow chart for explaining a handover method in a mobile communication system according to a third embodiment of the present disclosure, FIG. 11 is a conceptual diagram for explaining a difference between SFNs of source and target base stations in the LTE or NR mobile communication system, and FIG. 12 is a conceptual diagram for explaining a configuration example of a SS burst in which downlink synchronization signals and PBCHs are transmitted.

The handover method illustrated in FIG. 10 is briefly reconstructed with reference to procedures necessary for explaining the embodiment of the present disclosure, and detailed procedures and subsequent procedures are omitted.

Referring to FIG. 10, similarly to the case of FIG. 6, the terminal 100 may measure signal strengths of neighbor base stations according to a measurement configuration (S1010) of the source base station 110 (S1011), and report a measurement result to the source base station (S1012). Based on the measurement result received from the terminal, the source base station 110 may determine whether to handover the terminal to the target base station 120 (S1020), and instruct the target base station to prepare for the handover by transmitting a handover request message to the target base station (S1030). The target base station may determine whether to accept the handover of the terminal (S1031), and transmit a handover request acknowledgment message to the source base station when it is determined to accept the handover (S1032). Also, the source base station receiving the handover request acknowledgement message from the target base station may transmit a handover command message to the terminal to instruct the terminal to execute the handover (S1040).

Meanwhile, according to the third embodiment of the present disclosure, the source base station 110 may transmit the handover command message including information on a difference between system timings of the source base station and the target base station (hereinafter, 'system timing difference information') to the terminal 100 (S1040). Here, the system timing difference information may be generated by the source base station. Alternatively, the system timing difference information may be generated by the target base station and transmitted to the source base station as included in the handover request acknowledgment message.

That is, the source base station may transmit the handover command message to the terminal by including the system timing difference information of the source base station and the target base station so that the terminal can transmit the RACH according to the PRACH configuration of the target base station without decoding the MIB of the target base station. The terminal may derive the system timing of the target base station from the system timing of the source base station using the system timing difference information and perform a random access to the target base station based on the derived system timing of the target base station and the PRACH configuration of the target base station (S1050).

Referring to FIG. 11, SFNs, frame boundaries, and subframe boundaries of the source base station and the target base station may differ from each other in the LTE or NR mobile communication system. For example, when a SFN of the source base station is 512 at the time of generating the system timing difference information, a SFN of the corresponding target base station may be 489.

For example, the system timing difference information may include information indicating whether the SFN (simply, 'SFN$_S$') of the source base station and the corresponding SFN (simply, 'SFN$_T$') of the target base station both are even numbers or odd numbers or whether the SFN$_T$ is an odd (even) number when the SFN$_S$ is an even (odd) number. Alternatively, the system timing difference information may include a value indicating a difference between the SFN$_S$ and the SFN$_T$. That is, the system timing difference information may be configured using at least one of representation schemes below.

Scheme 1) using 1 bit: information indicating whether SFN$_T$ is odd or even when SFN$_S$ is even or odd.

Scheme 2) using X bits: (SFN$_S$–SFN$_T$) mod $2^X$, information indicating the difference between SFN$_S$ and SFN$_T$ using a range 0 to $2^X$–1.

Scheme 3) using Y bits: (SFN$_S$–SFN$_T$) mod $2^Y$, information indicating the difference between SFN$_S$ and SFN$_T$ using a range 0 to $2^Y$–1 (i.e., the difference itself). Here, Y is set to 10 because maxSFN is 1023 in the LTE system.

Meanwhile, in the LTE mobile communication system, one slot has a time length of 0.5 ms, whereas in the NR mobile communication system, one slot may have a time length of 0.125 ms. Also, in the NR mobile communication system, a subframe duration may vary according to a subcarrier spacing (SCS). Therefore, in the case of the NR mobile communication system, a method capable of more precisely indicating the difference between system timings of the source base station and the target base station is needed.

Referring to FIG. 12, in the NR mobile communication system, synchronization signal (SS) burst set periods are periodically repeated, and a SS burst which comprises a plurality of synchronization signal blocks (SSBs) is transmitted in each SS burst set period. Also, each SSB is composed of a Primary Synchronization Signal (PSS), a Secondary Synchronization Signal (SSS), and a Physical Broadcast Channel (PBCH). For example, in FIG. 5, SS burst set periods are repeated with periodicity of 20 ms, and a SS burst having the length of 0.5 ms and comprising 8 SSBs is transmitted in each SS burst period set period.

Accordingly, the system timing difference information may include a multiple of a predetermined unit time expressed as a difference between predetermined reference time points of the source base station and the target base station.

As an example, the reference time point may be defined as a reference time point defined in advance within a PBCH Transmission Time Interval (TTI). Specifically, a boundary of a first subframe (i.e., subframe 0) within each PBCH TTI of the source and target base stations may be set as the reference time point, and the difference between the reference time points of the source and target base stations may be represented as the system timing difference information by a multiple of the predetermined unit time. Here, in case that a PBCH TTI that is an update periodicity of PBCH is 80 ms and the predetermined unit time is (⅐) ms, the system timing information may indicate a value ranging from 0 to 559 and may be represented with 10 bits.

As another example, the reference time point may be defined as a reference time point defined in advance within a SS burst set period. Specifically, a boundary of a first subframe (i.e., subframe 0) within each SS burst set period of the source and target base stations may be set as the reference time point, and the difference between the reference time points of the source and target base stations may be represented as the system timing difference information by a multiple of the predetermined unit time. Here, in case that the length of the SS burst set period is 20 ms and the predetermined unit time is (⅐) ms, the system timing information may indicate a value ranging from 0 to 139 and may be represented with 8 bits.

Composition of Uplink Resource Allocation Information

In the RACH-less handover method described above, the target base station may transmit the uplink resource allocation information to the terminal using 'ul-ConfigInfo' which is an information element of a RRC signaling message illustrated in FIG. 13.

Here, there is a problem that the terminal and the target base station cannot synchronize their timings on from which time point the uplink resources are available and until which time point the uplink resources are valid. As a result, the uplink resource may be wasted or the handover interruption time may be increased.

Therefore, as a fourth embodiment of the present disclosure, the target base station may further include information on a starting SFN (startSFN) and a valid duration in which the uplink resources are reserved in the uplink resource allocation information.

The SFN of the target base station can be identified on the basis of the system timing difference information included in the handover command message received from the source base station according to the third embodiment. Accordingly, the terminal can check a starting time and a valid duration of the uplink resources allocated to itself based on the SFN of the target base station and the starting SFN and the valid duration included in the uplink resource allocation information.

Figure 14:
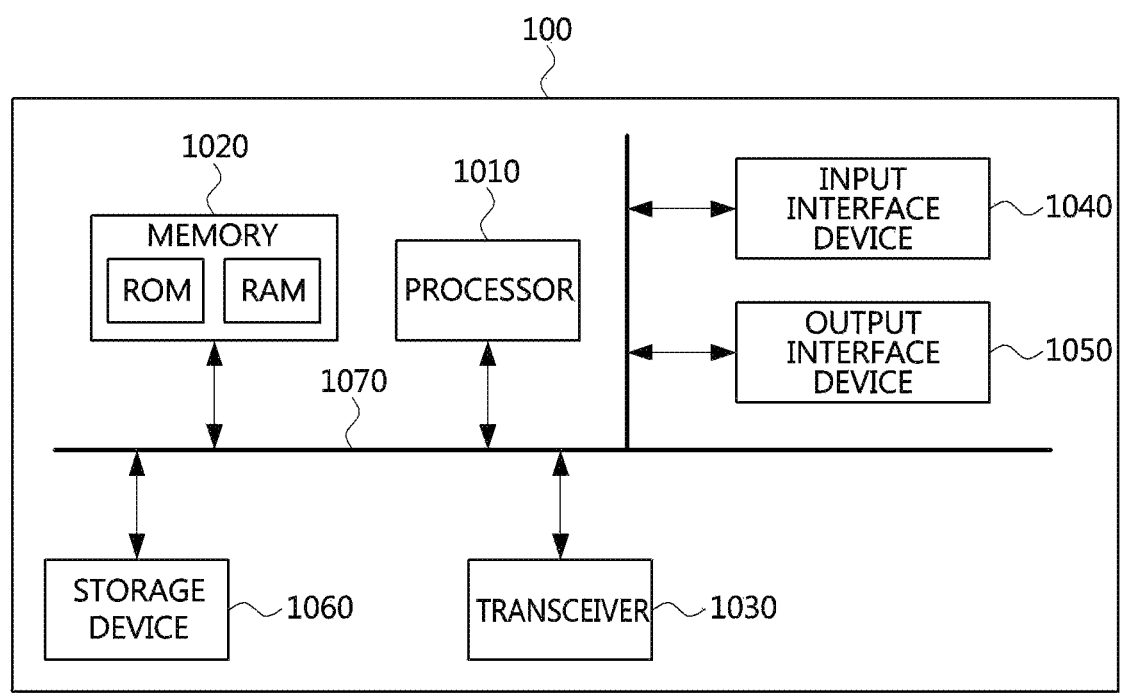
FIG. 14 is a block diagram illustrating a structure of a terminal to which embodiments of the present disclosure are applied.

FIG. 14 is a block diagram illustrating a structure of a terminal to which embodiments of the present disclosure are applied.

Although a general structure which may be applied to a terminal in a mobile communication system is described with reference to FIG. 14, the same or similar structure may be applied to a base station in the mobile communication system.

Referring to FIG. 14, the terminal 100 may comprise at least one processor 1010, a memory 1020, and a transceiver 1030 connected to a network for performing communications. Also, the terminal 100 may further comprise an input interface device 1040, an output interface device 1050, a storage device 1060, and the like. Each component included in the apparatus 100 may communicate with each other as connected through a bus 1070. However, each of the components included in the terminal 100 may be connected to the processor 1010 via a separate interface or a separate bus rather than the common bus 1070. For example, the processor 1010 may be connected to at least one of the memory 1020, the transceiver 1030, the input interface device 1040, the output interface device 1050, and the storage device 1060 via a dedicated interface.

The processor 110 may execute at least one instruction stored in at least one of the memory 1020 and the storage device 1060. The processor 1010 may refer to a central processing unit (CPU), a graphics processing unit (GPU), or a dedicated processor on which methods in accordance with embodiments of the present disclosure are performed. Each of the memory 1020 and the storage device 1060 may be constituted by at least one of a volatile storage medium and a non-volatile storage medium. For example, the memory 1020 may comprise at least one of read-only memory (ROM) and random access memory (RAM).

The at least one instruction may be configured such that the processor 1010 performs the steps constituting the handover methods according to the embodiments of the present disclosure described above, and all messages exchanged between the base station and the terminal may be transmitted and received via the transceiver 1030 under controls of the processor 1010.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal for a handover in a mobile communication system, the operation method comprising:

performing measurement on beams of a target base station, and transmitting a measurement result of at least one beam of the target base station to a source base station;

receiving, from the source base station, a handover command message including information on at least one Random Access Channel (RACH) resource for the at least one beam of the target base station;

transmitting a handover indication message including information on at least one random access target beam having an order of channel conditions determined based on a latest measurement to the source base station or to the target base station through the source base station after determining execution of the handover when a handover execution event is met after receiving the handover command message; and determining an optimal beam among the at least one random access target beam, and transmitting a RACH to the target base station through a RACH resource allocated to the optimal beam.

2. The operation method according to claim 1, further comprising transmitting a RACH through a RACH resource allocated to a next priority beam among the at least one random access target beam, when a response to the RACH transmitted through the RACH resource allocated to the optimal beam is not received from the target base station.

3. The operation method according to claim 1, wherein the target base station transmits the information on the at least one RACH resource to the source base station by including the information on at least one RACH resource in a handover request acknowledgement message.

4. The operation method according to claim 1, wherein at least one RACH resource allocated to the at least one random access target beam is reserved by the target base station after the target base station receives the handover indication message.

5. An operation method of a terminal for a handover in a mobile communication system, the operation method comprising:

performing measurement on beams of a target base station, and transmitting a measurement result of at least one beam of the target base station to a source base station;

receiving, from the source base station, a handover command message including information on at least one Random Access Channel (RACH) resource for the at least one beam;

transmitting a handover indication message including information on at least one random access target beam having an order of channel conditions determined based on a latest measurement to the source base station or to the target base station through the source base station after determining execution of the handover when a handover execution event is met after receiving the handover command message; and determining an optimal beam among the at least one random access target beam, and transmitting a RACH to the target base station through a RACH resource allocated to the optimal beam, wherein the handover indication message further includes buffer status information, a handover complete message, or Protocol Data Unit (PDU) reception state information of the terminal in order to reduce a handover interruption time.

6. An operation method of a terminal for a handover in a mobile communication system, the operation method comprising:

performing measurement on a target base station, and transmitting a measurement result of at least one beam of the target base station to a source base station;

receiving, from the source base station, a handover command message including a timing adjustment (TA) value to be used by the terminal for the target base station;

determining a handover time, and transmitting a handover indication message including information on the determined handover time to the source base station and to the target base station through the source base station; and executing the handover by performing uplink transmission to the target base station at the handover time, wherein the uplink transmission is performed using the TA value without a random access procedure.

7. The operation method according to claim 6, wherein handover timings of the terminal, the source base station, and the target base station are synchronized based on the handover time.

8. The operation method according to claim 6, wherein information on an uplink resource used for the uplink transmission is received as included in the handover command message, and the uplink resource is reserved based on the handover time after receiving the handover indication message from the target base station.

9. The operation method according to claim 6, wherein information on an uplink resource used for the uplink transmission is received from the target base station after the handover indication message is transmitted to the target base station.

10. The operation method according to claim 9, wherein the information on the uplink resource includes a starting time from which the uplink resource is available and a duration during which the uplink resource is valid.

11. An operation method of a terminal for a handover in a mobile communication system, the operation method comprising:

performing measurement on a target base station, and transmitting a measurement result of at least one beam of the target base station to a source base station;

receiving, from the source base station, a handover command message including a timing adjustment (TA) value to be used by the terminal for the target base station;

determining a handover time, and transmitting a handover indication message including information on the determined handover time to the source base station and to the target base station through the source base station; and performing uplink transmission to the target base station at the handover time, wherein the source base station continues downlink transmission to the terminal until the handover time.

12. The operation method according to claim 6, wherein when the handover time is indicated by a period (T) from a time point at which the handover indication message is received at the source base station, the target base station determines the handover time by using a value obtained by subtracting a latency of an interface between the source base station and the target base station from the period (T).

13. An operation method of a terminal for a handover in a mobile communication system, the operation method comprising:

performing measurement on a target base station, and transmitting a measurement result of at least one beam of the target base station to a source base station;

receiving, from the source base station, a handover command message including a timing adjustment (TA) value to be used by the terminal for the target base station;

determining a handover time, and transmitting a handover indication message including information on the determined handover time to the source base station and to the target base station through the source base station; and performing uplink transmission to the target base station at the handover time, wherein the uplink transmission is performed using the TA value without a random access procedure, and wherein the handover indication message further includes buffer status information, a handover complete message, or Protocol Data Unit (PDU) reception state information of the terminal in order to reduce a handover interruption time.

14. The operation method according to claim 1, wherein the handover command message further includes system timing difference information between the source base station and the target base station, and the transmitting of the RACH is performed further based on a system timing of the target base station derived from a system timing of the source base station by using the system timing difference information.

15. The operation method according to claim 14, wherein the system timing difference information includes a difference between a system frame number (SFN) of the source base station and a SFN of the target base station.

16. The operation method according to claim 14, wherein the system timing difference information includes information indicating whether a SFN of the target base station is odd or even when a SFN of the source base station is odd or information indicating whether the SFN of the target base station is odd or even when the SFN of the source base station is even.

17. The operation method according to claim 14, wherein the system timing difference information includes a multiple of a predetermined unit time representing a difference between predetermined reference times of the source base station and the target base station.

18. The operation method according to claim 17, wherein the predetermined reference time is a specific time boundary of the source base station.

* * * * *